US006284962B1

(12) United States Patent
Gardner et al.

(10) Patent No.: US 6,284,962 B1

(45) Date of Patent: Sep. 4, 2001

(54) BODY SUPPORTED PERCUSSIVE ARRANGEMENT

(76) Inventors: Maryann Gardner; Christopher Gardner, both of 218 MacDade Blvd., Milmont Park, PA (US) 19033

(*) Notice: Subject to any disclaimer, the term of this patent is extended or adjusted under 35 U.S.C. 154(b) by 0 days.

(21) Appl. No.: 09/482,410

(22) Filed: Jan. 13, 2000

(51) Int. Cl.[7] .............................. G10H 7/00; G10H 3/00; G09B 15/02

(52) U.S. Cl. ............................ 84/600; 84/723; 84/477 R; 455/88

(58) Field of Search ............................. 84/600, 723–725, 84/730, 743, 634, 477 R, DIG. 24; 455/88; 381/9, 12

(56) References Cited

U.S. PATENT DOCUMENTS

| | | | | |
|---|---|---|---|---|
| 3,659,032 | | 4/1972 | May | 84/600 |
| 4,201,107 | * | 5/1980 | Brber, Jr. et al. | 84/743 |
| 4,635,516 | | 1/1987 | Giannini | 84/600 |
| 4,753,146 | * | 6/1988 | Seiler | 84/730 |
| 4,908,868 | * | 3/1990 | McTaggart | 381/12 |
| 5,192,823 | | 3/1993 | Suzuki et al. | 84/600 |
| 5,265,516 | | 11/1993 | Usa et al. | 84/600 |
| 5,290,964 | * | 3/1994 | Hiyoshi et al. | 84/600 |
| 5,841,052 | | 11/1998 | Stanton | 84/600 |
| 5,847,305 | * | 12/1998 | Yoshikawa et al. | 84/634 |
| 5,855,080 | * | 1/1999 | Van Staden | 84/730 |
| 6,091,329 | * | 7/2000 | Newman | 455/88 |

* cited by examiner

*Primary Examiner*—Marlon T. Fletcher
(74) *Attorney, Agent, or Firm*—Henderson & Sturm LLP

(57) ABSTRACT

A body supported percussive arrangement (10) including a wrist worn percussive unit (11) and a wireless amplifier unit (12) which may either be worn on the user's torso or disposed at a remote location. The wrist worn percussive unit (11) includes a wrist watch casing shaped housing member (20) provided with a wrist strap arrangement (30) and containing a pick up coil (21) and a printed circuit board (22) which generate an acoustic signal in response to vibrations transmitted through housing member (20). The wireless amplifier unit (12) includes an amplifier speaker (41) contained within an amplifier housing member (40) having an on off switch (42), a volume control switch, and a two tiered LED graphic display responsive to both the amplifier volume setting and the acoustic signal generated by the percussive unit.

6 Claims, 2 Drawing Sheets

BODY SUPPORTED PERCUSSIVE ARRANGEMENT

BACKGROUND OF THE INVENTION

1. Field of the Invention

The present invention relates to the field of percussive sound systems in general, and in particular to a body worn sound generating device that is coupled to a remote amplifier.

2. Description of Related Art

As can be seen by reference to the following U.S. Pat. Nos. 3,659,032; 4,635,516; 5,841,052; 5,265,516; and 5,192,823, the prior art is replete with myriad and diverse percussive sound generating systems.

While all of the aforementioned prior art constructions are more than adequate for the basic purpose and function for which they have been specifically designed, they are uniformly deficient with respect to their failure to provide a simple, efficient, and practical body supported percussive sound system that will produce a variety of percussive sounds depending upon the texture of the object that is struck by the user who is wearing the sound system.

While the prior art discloses a variety of technically sophisticated percussive sound systems, there arrangements are very expensive since they are directed toward professional musicians and they are also subject to breakage and/or system failure due to the large number of components employed.

As a consequence of the foregoing situation, there has existed a longstanding need for a new and improved yet relatively simple and inexpensive percussive sound system that is entirely supported by the user's body and the provision of such a construction is a stated objective of the present invention.

BRIEF SUMMARY OF THE INVENTION

Briefly stated, the body supported percussive arrangement that forms the basis of the present invention comprises in general a wrist worn percussive unit and a wireless torso supported amplifier unit that is responsive to the output of the percussive unit.

As will be explained in greater detail further on in the specification, the percussive unit includes a pick up coil and a printed circuit board contained within a plastic housing member which resembles a wrist watch casing and is provided with a wrist strap arrangement such that the percussive unit may be worn on a user's wrist such that when the user's fingers, hand, wrist, or the plastic housing member contacts surfaces having different textures and hardness, an acoustical signal will be generated by the percussive unit that can be received by the wireless amplifier unit.

In addition, the wireless amplifier unit includes a mini-amplifier speaker contained within an amplifier speaker housing and controlled by both an on-off switch and a volume switch. The amplifier housing member is further provided with a two tiered LED graphic display, an antenna, and a belt clip such that the wireless amplifier unit may be worn on the user's torso.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
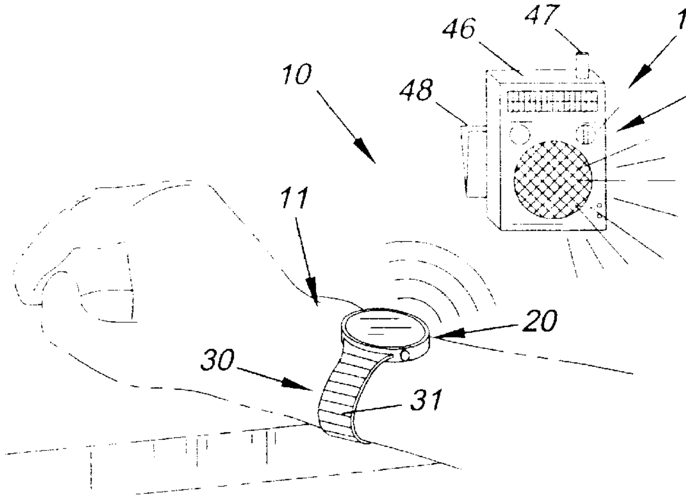
FIG. 1 is a perspective view of the body supported percussive arrangement that forms the basis of the present invention.

As can be seen by reference to the drawings, and in particular to FIG. 1, the body supported percussive arrangement that forms the basis of the present invention is designated generally by the reference number 10. The percussive arrangement 10 comprises in general, a wrist worn percussion unit 11, and a remote wireless amplifier unit 12. These units will now be described in seriatim fashion.

Figure 3:
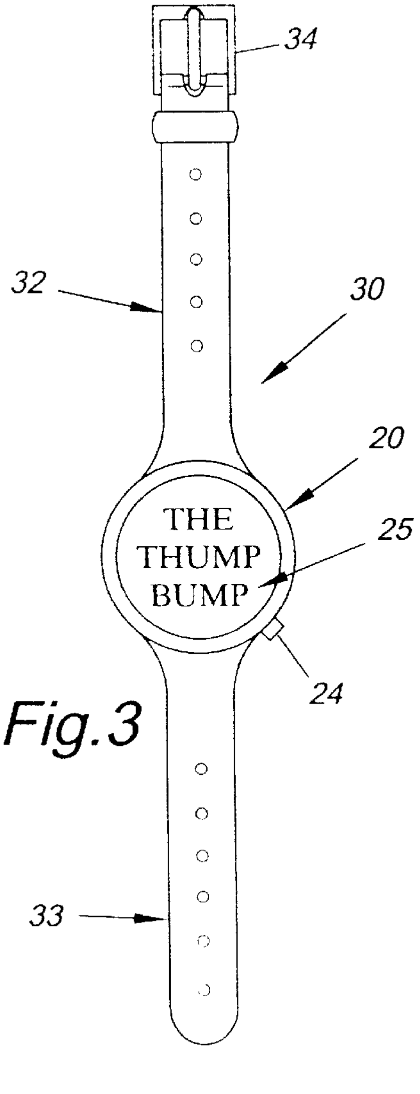
FIG. 3 is an isolated top plan view of the wrist worn percussive unit.

As shown in FIGS. 1 and 3, the percussion unit 11 comprises a hard plastic housing member 20 in the shape of a wrist watch casing. The housing member 20 is provided with a strap arrangement designated as 30 wherein the strap arrangement 30 may comprise either the conventional expansible wrist strap 31 of FIG. 1 or the conventional plural wrist straps 32, 33 and clasp 34 of FIG. 3.

Figure 5:
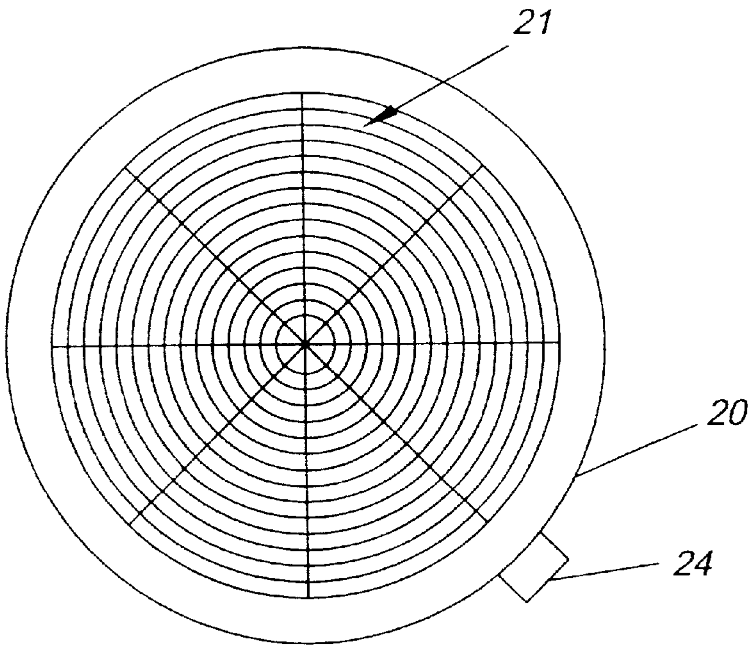
FIG. 5 is an isolated top plan view of the pick up coil contained within the percussive unit.
Figure 6:
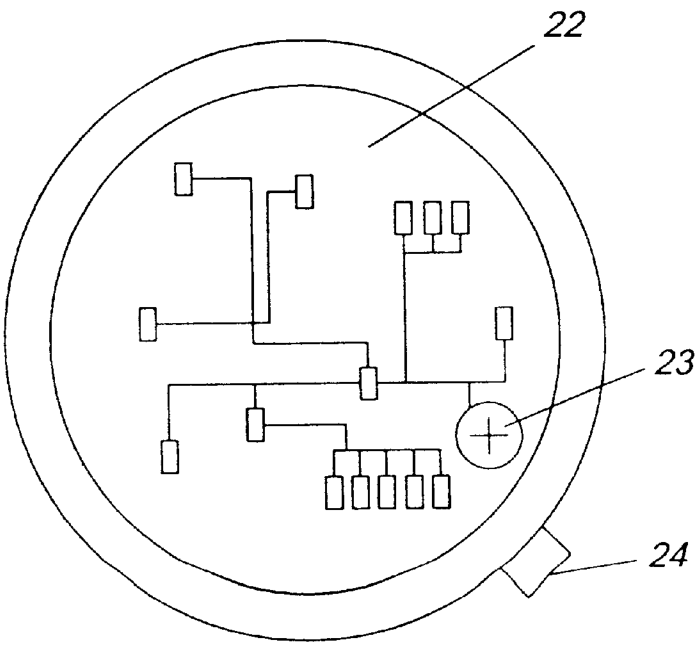
FIG. 6 is a schematic diagram of the chip board and power source for the percussive unit.

Turning now to FIGS. 5 and 6, it can be seen that the interior of the housing member 20 is provided with a pick up coil 21 electronically coupled to a chip board 22 powered by a watch sized battery power source 23 controlled by an on off switch 24. The pick up coil 21 chip board 22 and the battery power source 23 are concealed beneath a face plate 25 on the housing member 20.

In addition, the pick up coil 21 and the chip board 22 cooperate with one another in a well recognized fashion to transmit an acoustical signal to the remote amplifier unit 12 in response to the user's hand, fingers, wrist, or the housing member 20 coming into forcible contact with different textured surfaces to impart vibratory motion through the housing member 20 to activate the pick up coil 21.

Figure 2:
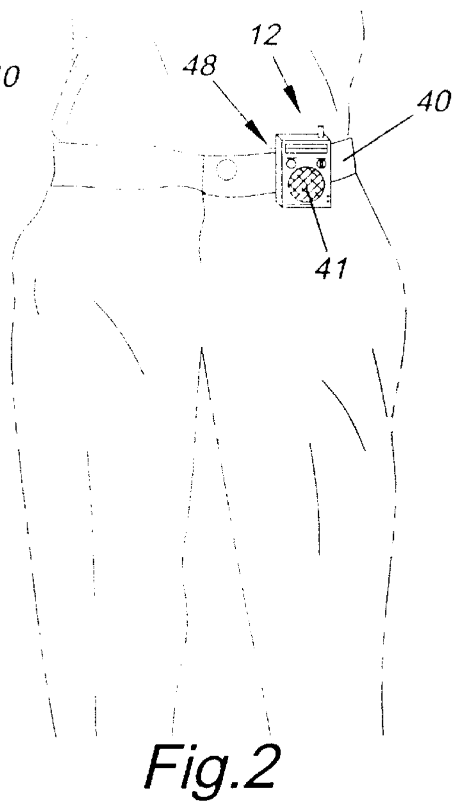
FIG. 2 is an isolated perspective view of the torso supported amplifier unit.

Turning now to FIGS. 1 and 2, it can be appreciated that this invention contemplates positioning the wireless amplifier unit 12 either at a remote location as depicted in FIG. 1, or adapting the amplifier unit 12 to be worn on the user's torso via a belt clip 48 or the like.

Figure 4:
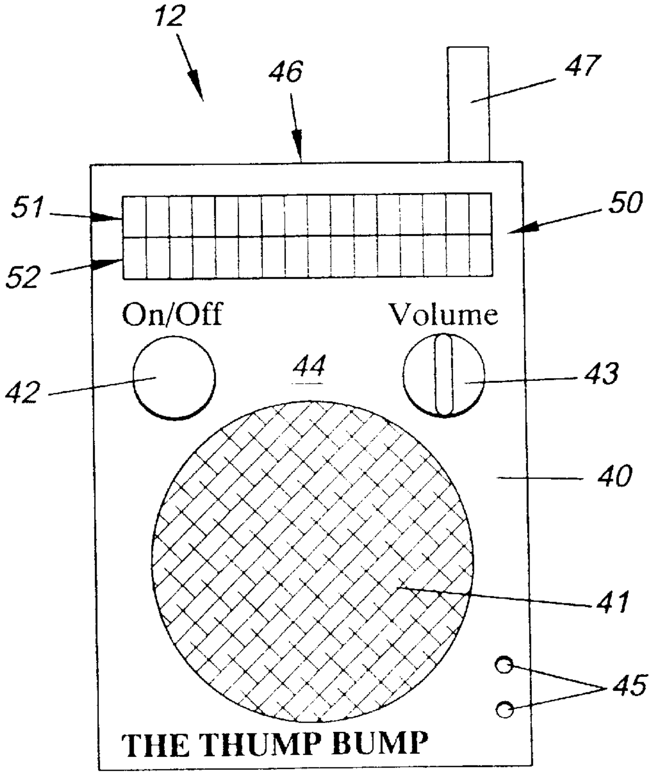
FIG. 4 is an isolated front elevation view of the amplifier unit.

As can best be seen by reference to FIG. 4, the remote amplifier unit 12 includes an amplifier housing member 40 which contains an amplifier speaker 41 controlled by an on off switch 42 and a volume control switch 43.

In addition, the front face 44 of the amplifier housing 40 is provided by a two tiered LED display designated generally as 50. The top row 51 registers the output of the amplifier speaker 41 and the bottom row 52 registers the volume setting of the amplifier unit 12.

Still referring to FIG. 4, it can be seen that the front face 44 of the amplifier housing 40 is provided with jack ports 45 that allow the amplifier unit 12 to be connected to a conventional receiver (not shown) and the top 46 of the amplifier housing is provided with a telescoping antenna 47.

Returning once more go FIG. 1, it can be seen that the amplifier housing member 40 is also is also provided with a belt clip 48 such that the amplifier housing member 40 can be worn on the user's torso.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A body supported percussive arrangement consisting of:

a wrist worn percussive unit including a first housing member in the shape of a wrist watch casing and having an interior provided with a pick up coil and an electrical circuit board powered by a battery power source and controlled by an on off switch which projects beyond the housing member;

a wrist strap arrangement operatively associated with the first housing member for releasably attaching the first housing member to a user's wrist; and, a wireless amplifier unit including a second housing member containing an amplifier speaker responsive to an acoustic signal generated by the wrist worn percussive unit and provided with an on off control switch and a volume control switch, wherein the second housing is provided with an LED graphic display including a two tiered display having a top row and an bottom row wherein one of the rows registers the acoustic signal generated by the percussive unit and the other row registers the volume setting on the wireless amplifier unit.

2. The percussive arrangement as in claim 1 wherein said first housing member is fabricated of plastic.

3. The percussive arrangement as in claim 2 wherein said second housing member is provided with a belt clip.

4. The percussive arrangement as in claim 3 wherein said second housing member is provided with an antenna.

5. The percussive arrangement as in claim 1 wherein said top row registers the acoustic signal generated by the percussive unit.

6. The percussive arrangement as in claim 5 wherein said bottom row registers the volume setting on the wireless amplifier unit.

* * * * *